United States Patent [19]

Nishimoto

[11] Patent Number: 5,500,728
[45] Date of Patent: Mar. 19, 1996

[54] PHOTOELECTRIC DISTANCE SENSOR

[75] Inventor: Ikuo Nishimoto, Kanagawa, Japan

[73] Assignee: Yamatake-Honeywell Co., Ltd., Tokyo, Japan

[21] Appl. No.: 172,634

[22] Filed: Dec. 22, 1993

[30] Foreign Application Priority Data

Aug. 3, 1993 [JP] Japan .................................... 5-192616

[51] Int. Cl.$^6$ ................................ G01C 3/00; G03B 3/00
[52] U.S. Cl. ........................ 356/3.03; 354/403; 356/4.01
[58] Field of Search .................................. 356/1, 4, 4.01, 356/3.03–3.07; 354/403

[56] References Cited

U.S. PATENT DOCUMENTS

| | | | |
|---|---|---|---|
| 3,679,307 | 7/1972 | Zoot et al. | 356/4 |
| 5,157,435 | 10/1992 | Min et al. | 354/403 |
| 5,337,116 | 8/1994 | Nonaka et al. | 354/403 |

Primary Examiner—Stephen C. Buczinski
Attorney, Agent, or Firm—Lane, Aitken & McCann

[57] ABSTRACT

The photoelectric distance sensor for sensing a distance to a sense object by irradiating light to the sense object, the photoelectric distance sensor comprises a light-irradiating section 3 for irradiating light to a sense object 6, a light-receiving section for receiving the reflected light from the sense object 6, an operating section for outputting the distance to the sense object 6 and the target value of received light amount fitted to the distance on the signal of the light-receiving section 4, and a light-irradiation-controlling section 17 for controlling a light irradiation amount on the target value of received light amount, and the photoelectric sensor is for controlling the light irradiation amount in order that the received light amount becomes the most fitted value according to the distance, and further the photoelectric sensor can enlarge the light irradiation amount according to the distance in near distances and can make measurement precision be improved.

8 Claims, 11 Drawing Sheets

THE VARIATION OF RECEIVED
LIGHT AMOUNTS WHEN IRRADIATED
LIGHT AMOUNTS ARE CONSTANT

PHOTOELECTRIC DISTANCE SENSOR

BACKGROUND OF THE INVENTION

1. Field of the Invention

The present invention relates to a photoelectric distance sensor for sensing distances to objects by irradiating light to the objects and by receiving the reflected light from the objects.

2. Description of the Prior Art

FIG. 1 is a block diagram drawn with single lines for explaining the basic operation of a conventional photoelectric distance sensor for sensing positions. In FIG. 1, reference numeral 1 denotes a photoelectric distance sensor, and numeral 2 denotes an optical system mainly composed of lenses. Numeral 3 denotes a light-irradiating section mainly composed of a light-emitting device such as an light-emitting diode- Numeral 4 denotes a light-receiving section arranged on a light-receiving surface and mainly composed of light-receiving devices. Numeral 5, 6 and 7 denote a signal-processing section, a sense object and a background respectively.

FIG. 2 is a longitudinal section of a light-position-sensing device 10 arranged in a direction connecting a light-receiving axis with a light-irradiating axis on the light-receiving surface. As the light-position-sensing device 10, the disclosed in Patent Publication Gazette No. 42411 of 1983 is adopted, for example. It has the characteristic shown in FIG. 3.

The operation of the photoelectric distance sensor 1 will now be described. Light from the light-irradiating section 3 is irradiated on the sense object 6 through the light-irradiating axis, and forms an bright spot on the sense object 6. Light reflected by the sense object 6 travels into the light-receiving section 4 through the light-receiving axis. In the light-receiving section 4, bright spot images are formed on the light-receiving surface at positions corresponding to distances to the sense object 6. When light travels into a certain position on the light-position-sensing device 10 located on the light-receiving surface in order to determine the bright spot positions on the light-receiving surface with an aim of determining distances X to the sense object 6, two current outputs Ia and Ib are obtained from the light-position-sensing device 10, as shown in FIG. 2. Light incidence positions Y into the light-position-sensing device 10 are obtained by the next relational expression, where an effective length of the light-position-sensing device 10 is denoted by L.

$$(Ia-Ib) / (Ia+Ib)=2Y/L \qquad (1)$$

The relational expression is depicted in FIG. 3.

The relation between the distances X and the light incidence positions Y is provided in a next relational expression.

$$XY=L2L3 \qquad (2)$$

In the expression, L2 denotes light axis pitches between incident lights and received lights, and L3 denotes distances between the light-receiving device and the lens. Because the light-position-sensing device 10 can determine the light incidence positions Y electrically as described above, and then can deduce distances X, it is widely used.

On the other hand, one of factors varying accuracies of the distances is differences of reflectances of the objects. That is, there was a problem that distance measurement errors between high reflectance objects such as white objects and low reflectance objects such as black objects being at the same distance were different in each other.

A method resolving the problem is to control irradiated light intensity to have receiving light intensity constant (for example, as disclosed in Laying-open Publication No. 39470 of 1974 and Patent Publication Gazette No. 42411 of 1983).

Because the method controls the irradiated light intensity so that the incident light amounts to the light-receiving section may be always constant, the incident light into the light-receiving section is not influenced by reflectances of objects and becomes constant. Therefore it has a superior effect that it can reduce errors occurred from reflectance differences at the same distance.

The resolving method has the superior feature above mentioned, however it has a problem which will be described as follows, on the other hand.

FIG. 5 is a characteristic diagram showing received light amount variations when irradiated light amounts are constant. FIG. 6 is a characteristic diagram showing the relation between sense distances and target values of the received light amounts. FIG. 7 is a characteristic diagram showing the relation between the sense distances and the irradiated light amounts.

The target values of the received light amounts cannot become larger than the received light amount from the object having the smallest reflectance and located at the largest distance within the distance-measurable range. Wide distance-measurable ranges make the target values of the received light amounts small.

That is, the received light amounts in the case where the irradiated light amounts are constant vary much, as shown in FIG. 5. in FIG. 5, region A is the distance-measurable range, region B is a nearest range, and region C is a distant unmeasurable range. Suppose that for example, received light amounts can be regarded to be inversely proportional to squares of distances in the region A, the distance-measurable range. Accordingly, the target values of the received light amounts cannot become larger than the values obtained from the smallest reflectance objects being at distant positions.

The wider the distance-measurable ranges become, the more serious the problem becomes. For example, if the distance of the sense object becomes three times wider, the variations of the received light amounts become one ninth under the condition of constant irradiated light amounts. In addition to this, reflectance differences of sense objects' surfaces exist. For example, white objects' reflectances differ from those of black objects in about ten times. Then, the received light amount from a black object on the most distant position becomes one ninetieth compared to that from a white object on the nearest position. Accordingly, because the target value of received light amount cannot be become larger than the value, the irradiated light amount becomes small to one ninetieth in the case where a white object exists on the nearest position. FIG. 6 and FIG. 7 depict this fact.

That is, the measurement accuracy of photoelectric distance sensors having wide distance-measurable ranges becomes worse than that of photoelectric distance sensors having narrow distance-measurable ranges, even in case of measuring the same object on the same distance. Displacement sensors outputting the displacement from predetermined distances essentially contain the entirely same problem as mentioned above.

SUMMARY OF THE INVENTION

An object of the present invention is to supply a photoelectric distance sensor capable of attaining the same distance measurement accuracy to wide distance-measurable ranges as that to narrow distance-measurable ranges.

Another object of the invention is to supply a photoelectric distance sensor capable of attaining the same high accuracy of measurement with wide set ranges of reference distances as that of the measurement of the objects being the same distances by photoelectric distance sensors having narrow set ranges of the reference distances.

To achieve above objects, the photoelectric distance sensor of the present invention comprises an operating section for operating distances to sense objects on position signals outputted by a light-receiving section forming images of bright spot images on the sense objects on a light-receiving surface and for operating target values corresponding to the operated distances, and a light-irradiation-controlling section for controlling the light intensity from a light-irradiating section irradiating light to the sense objects so that received light amounts in the light-receiving section may coincide the target values in the operating section.

Also, the photoelectric distance sensor of the invention comprises a light-receiving section forming images of bright spot images on sense objects on a light-receiving surface, a setting section for outputting operation coefficients corresponding to reference distances and target values corresponding to reference distances, an outputting section outputting displacement signals corresponding to position signals from the light-receiving section and operation coefficients from the setting section, and a light-irradiation-controlling section for controlling the light intensity from a light-irradiating section irradiating light to the sense objects so that received light amounts in the light-receiving section may coincide the target values corresponding to the reference distances.

DETAILED DESCRIPTION OF THE PREFERRED EMBODIMENTS

Hereafter, the preferred embodiments of the present invention will be described in detail with reference to the accompanying drawings.

Figure 8:
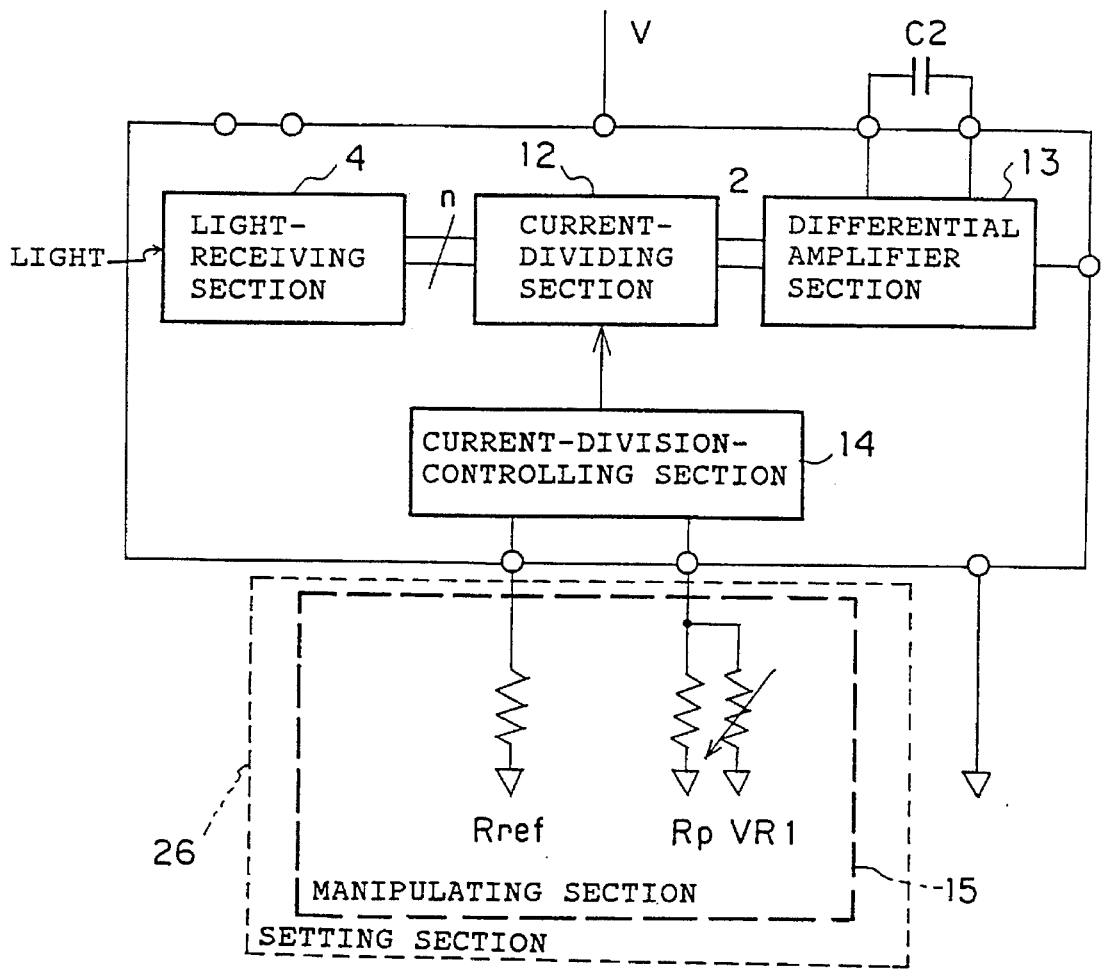
FIG. 8 is a block diagram of a photoelectric conversion apparatus to which the photoelectric distance sensor of the invention is applied.
Figure 9:
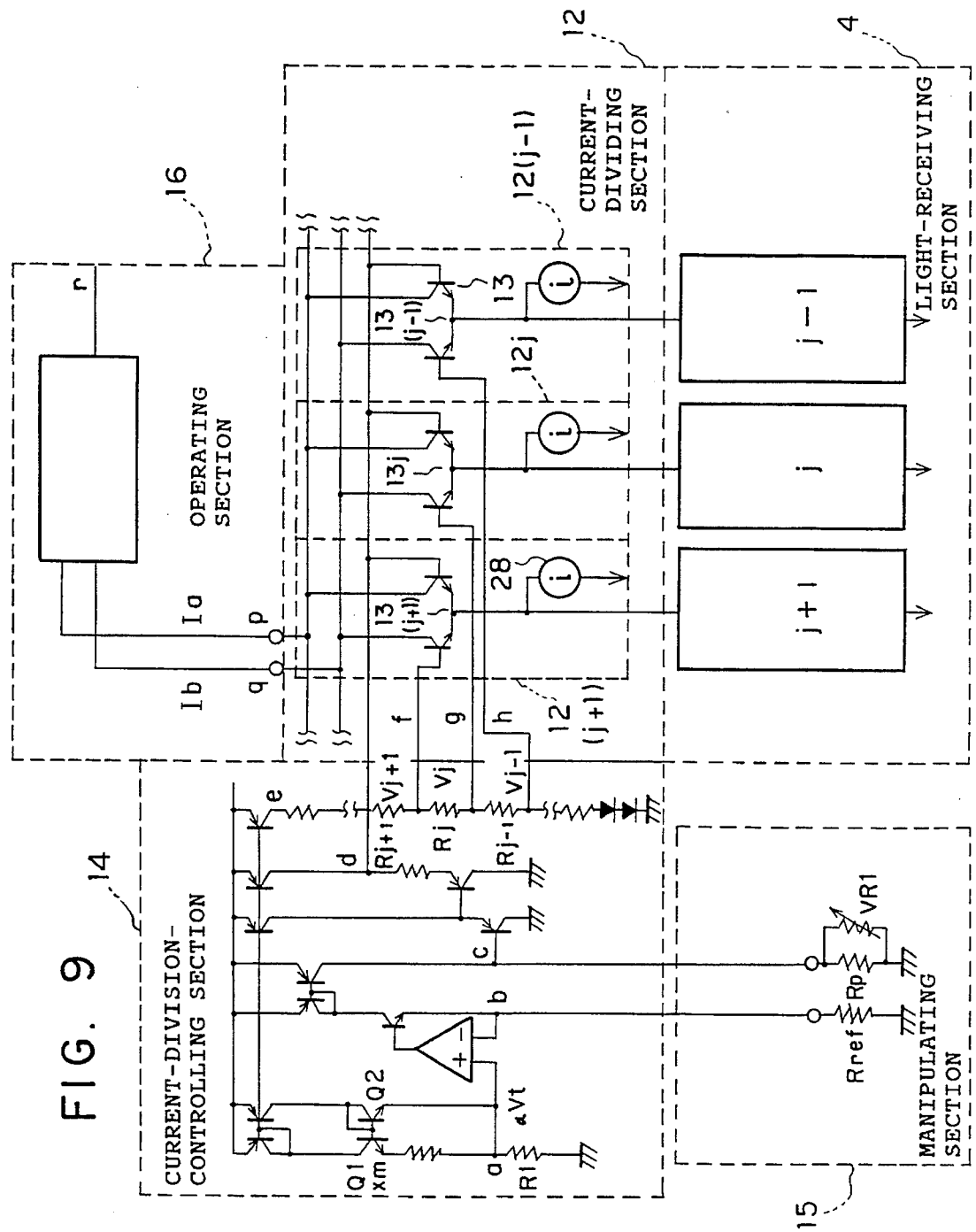
FIG. 9 is a circuit diagram showing the current-dividing section and the current-division-controlling section in FIG. 8 more concretely.
Figure 10:
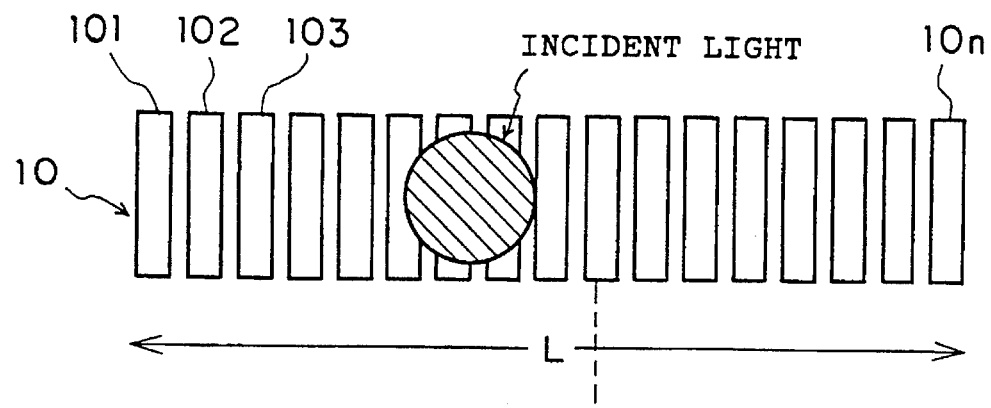
FIG. 10 is a plan view showing an arrangement of light-receiving elements to be arranged in a light-receiving section of the photoelectric distance sensor of the invention.
Figure 11:
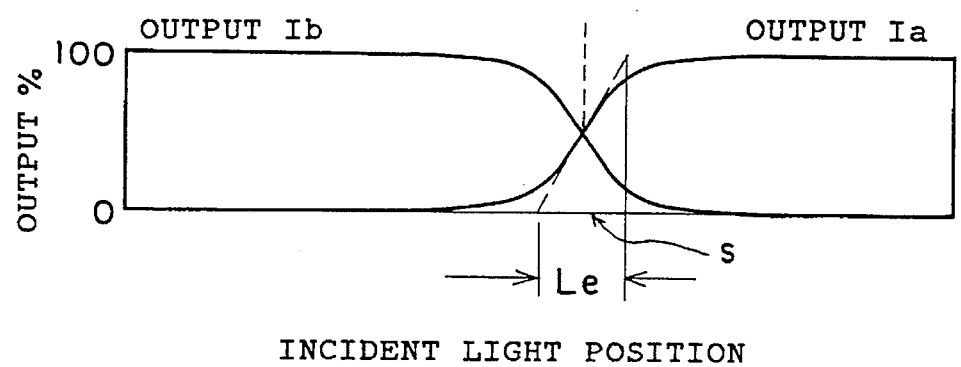
FIG. 11 is a characteristic diagram for explaining light position detection sensibilies of the light-receiving section of the photoelectric distance sensor of the invention.

FIG. 8 is a block diagram of a photoelectric conversion apparatus to which the photoelectric distance sensor of the invention is applied. FIG. 9 is a circuit diagram showing the current-dividing section and the current-division-controlling section in FIG. 8 more concretely. FIG. 10 is a plan view showing an arrangement of light-receiving elements arranged in a light-receiving section. FIG. 11 is a characteristic diagram for explaining light position detection sensibilies of the light-receiving section.

In FIG. 8, a current-dividing section 12 is connected to output terminals of a light-receiving section 4, and output terminals of the current-dividing section 12 are connected to a differential amplifier section 13. Also, a current-division-controlling section 14 for controlling the current-dividing section 12 is connected to the current-dividing section 12. Further, a setting section 26 is connected to the current-division-controlling section 14. And then, a manipulation section 15 is provided in a part of the setting section 26. Needless to say, the setting section 26 can be incorporated with the current-division-controlling section 14 in a circuit. However, the setting section 26 is drawn in the separated state from the current-division-controlling section 14 to better understanding.

Then, light-receiving elements in the light-receiving section 4 is formed by arranging many light-receiving elements 10, that is 101, 102, 103 . . . 10n, in a specified direction, as shown in, for example FIG. 10. Each photoelectric current from each light-receiving element is divided to a predetermined ratios ki(j), k2(j), k3(j) and k4(j) in the current-dividing section 72, and is connected to the first, second, third and fourth photoelectric current output terminal. That is, the much photoelectric current from the many light-receiving elements 101, 102, 103 . . . 104 are converted into four photoelectric current signals It1, It2, It3 and It4. For example distances are operated in use of the photoelectric current signals It1 and It2 as a following signal processing.

It is known that a voltage α in proportion to the Boltzmann voltage Vt (=kT/q) is generated at "a" point in FIG. 9, and α is determined by the ratio of sizes of transistor Q1 and Q2. Accordingly, the voltage at "b" point becomes α Vt, being independent of the resistance of a resistor Rref. Also, a voltage is generated at "c" point, and the value of the voltage is determined by the ratio of the resistor Rref and a synthesized resistance of a resistor Rp and a variable resistor VR1. The voltage at "c" point becomes the voltage at "d" point by shifted by a prescribed value. The voltage at "d" point is called a set voltage. The set voltage continuously changes in proportion to the resistance of the variable resistor VR1.

Because the current in proportion to the current flowing in a resistor R1 flows from "e" point, voltages at "f" point, "g" point and "h" point become smaller in order. And the differences among each point's voltage values become a constant value determined by the ratio of the resistor R1 and the resistor Rj, and the Boltzmann voltage Vt. The voltage is used to a reference voltage. In FIG. 9, only three resistors, a resistor Rj, a front resistor and a back resistor of it, are shown, but in fact such like resistors, the number of which corresponds to that of the light-receiving elements 10, are connected in series.

The light-receiving elements, except the jth one, a front one and a back one of it among many light-receiving elements 101, 102, 103, . . . 10n, are all omitted in FIG. 9. In the current-dividing section 12 are also depicted only three current dividers, a current divider 12j and a front current divider 12(j+1) and a back current divider 12(j– 1) of it. it. Each current divider has a couple of transistors, whose emitters are connected to each other. Each light-receiving element is connected to the emitters of these transistors; and ones of the collectors of each differential transistor are connected to the first current output terminal p, and the others of the collectors of those are connected to the second current output terminal q. Hereby, n photoelectric currents of n light-receiving elements are converted into two signals on terminals p and q. Ones of the bases of each differential transistor are inputted the reference voltages, and the others of bases of each transistor are inputted the set voltage. Though the set voltage is a common voltage to each current divider, the reference voltages have a predetermined voltage difference to each current divider; and the difference is the Boltzmann voltage multiplied by a constant.

Now, let us consider the case that the set voltage set by the variable resistor VR1 is near the jth reference voltage Vj. By adequately designing the reference voltage difference between adjoining current dividers 12(j+1) and 12(j–1), it is possible to regard that the reference voltages of all of the current dividers from the first to the (j–2) th are small enough to the set voltage, so almost all of the photoelectric current of the light-receiving elements 10 flows to the first current output terminal p, and that the reference voltages of all of the current dividers from the (j+2) th to nth are large enough to the set voltage, so almost all of the photoelectric current of the light-receiving elements 10 flows to the second current output terminal q.

Because the reference voltage Vj–1 of the (j–1)th current divider 12(j–1) is lower than the set voltage, much of the photoelectric current of the light-receiving elements 10 flows to the first current output terminal p. And, because the reference voltage Vj+1 of the (j +1)th current divider 12(j+1) is higher than the set voltage, much of the photoelectric current of the light-receiving elements 10 flows to the second current output terminal q. The photoelectric current of the jth light-receiving element flows to the first current output terminal p and the second current output terminal q, and the ratio of the current flowing to each output terminal can be set continuously by the value of the variable resistor VR1.

By composing the embodiment like this, the output characteristic which has sharp sensitivity to the variation of the incident light positions near the jth incident light position is obtained, as shown in FIG. 11, where the current from the first current output terminal p is presented by Ia and the current from the second current output terminal q is presented by Ib. That is, the characteristic near the jth position is equivalent to the characteristic of the light-position-sensing device which has the small total length Le of its light-receiving section, so that the sensibility multiplied by L/Le can be obtained.

Figure 7:
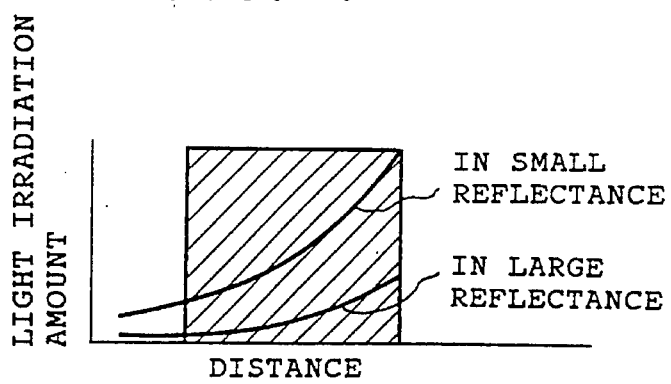
FIG. 7 is an explanatory drawing for explaining the relation between a distance range and irradiated light amounts in a conventional photoelectric distance sensor.

As mentioned above, the photoelectric current from n n>2) light-receiving elements is divided to the first photoelectric current output terminal and the second photoelectric current output terminal. As k1>0.5, much of the photoelectric current from the first light-receiving element flows into the first photoelectric current output terminal. As 0.5>kn, much of the photoelectric current from the nth light-receiving element flows into the second photoelectric current output terminal. As km≦kp (p=mm–1; m=2–n ), there is a position between the first and the nth position where the current ratio flowing to the second photoelectric current output terminal becomes larger than the current ratio flowing to the first photoelectric current output terminal. The light-receiving element is equivalent to what is divided into two parts at the above mentioned position of the light-receiving element 4, one of whose parts gives photoelectric current to the first photoelectric current output terminal, the other of whose parts gives photoelectric current to the second photoelectric current output terminal. The equivalent dividing position is determined by the ratios kj (j=1–n; 0kj≦1) determined in current-division-controlling section 14. This divided light-receiving element is equivalent to what receives light on whole body and has two outputs, one of which comes from the first current output terminal p, the other of which comes from the second current output terminal q. The light-position-sensing sensibility at a predetermined position of the divided light-receiving element becomes the sensitivity being multiplied by L/Le from FIG. 7 and FIG. 8, and the positions where the sensibility becomes high by the multiplication can be set at a desired position by a setting apparatus.

Figure 12:
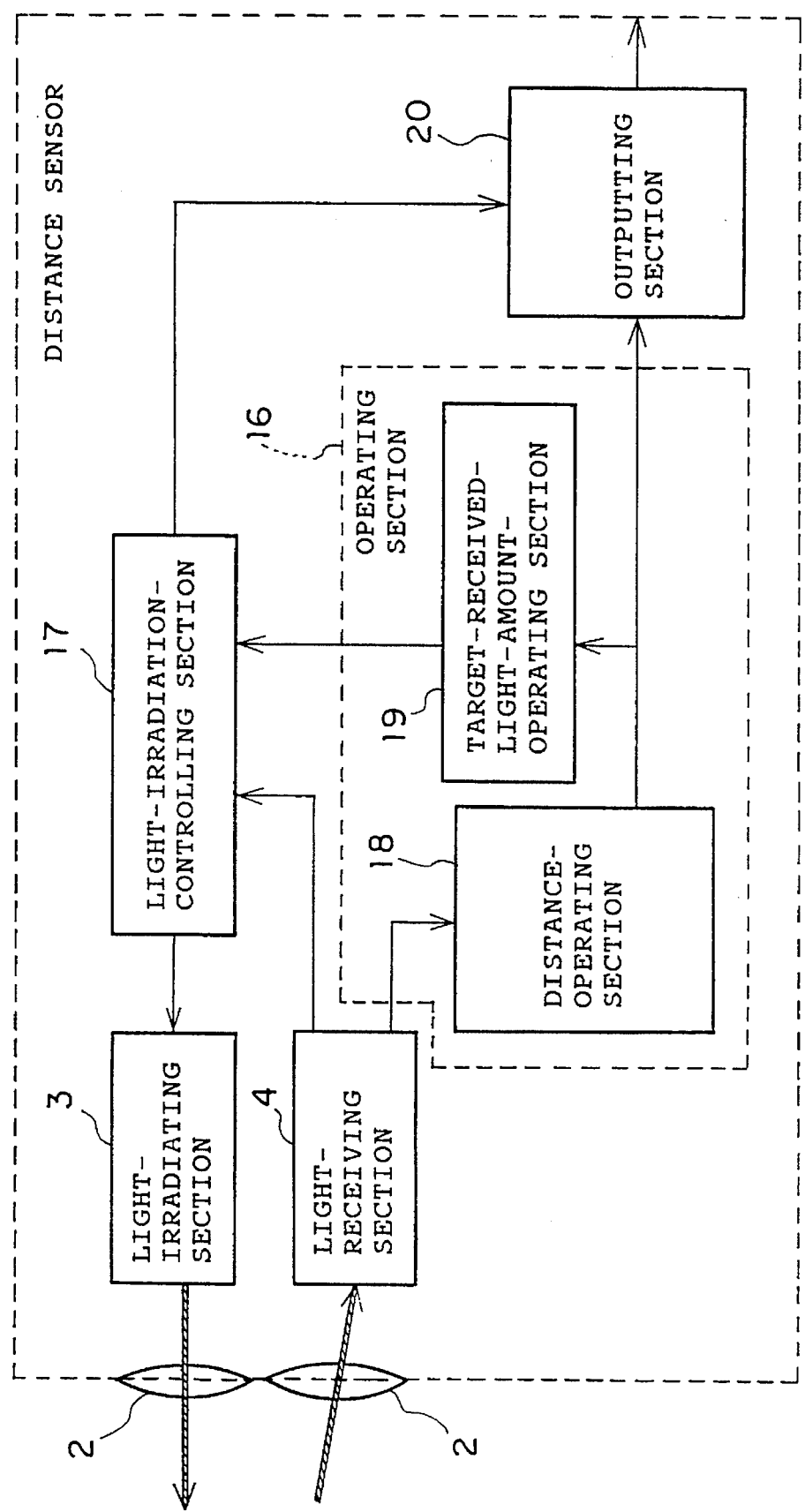
FIG. 12 is a block diagram showing an embodiment of the photoelectric distance sensor of the invention.
Figure 13:
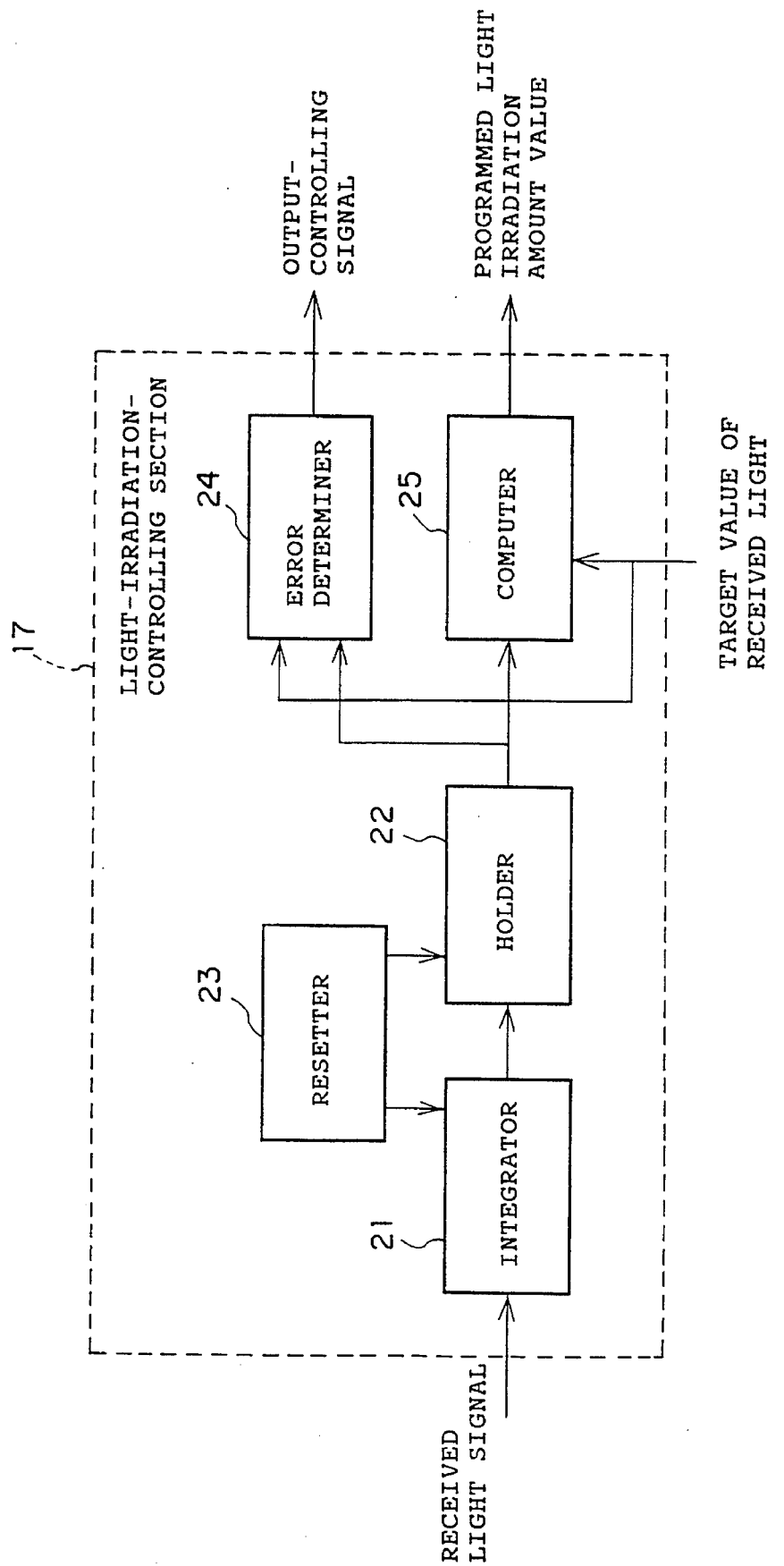
FIG. 13 is a block diagram showing the light-irradiation-controlling section of the photoelectric distance sensor shown in FIG. 12 more concretely.

FIG. 12 is a block diagram totally showing an embodiment of the photoelectric distance sensor of the invention. FIG. 13 is a block diagram showing the light-irradiation-controlling section of the photoelectric distance sensor shown in FIG. 12 more concretely.

The description of the embodiment of the photoelectric distance sensor will be made with taking FIG. 12 as an example. In FIG. 12, reference numeral 16 denotes an operating section. Numeral 17 denotes a light-irradiation-controlling section for controlling the light-irradiating section 3 by receiving the outputs of the light-receiving section 4. Numeral 18 denotes a distance-operating section for operating distances to the sense object 6 by receiving signals from the light-receiving section 4. Numeral 19 denotes a target-received-light-amount-operating section for controlling the light-irradiation-controlling section 17 by receiving the outputs of the distance-operating section 18. And, the operating section 16 is composed of the distance-operating section 18 and the target-received-light-amount-operating section 19. Further, numeral 20 denotes an outputting section for outputting output signals from the light-irradiation-controlling section 17 and the distance-operating section 18.

The light-irradiating section 3 irradiates light on the sense object 6 and forms a bright spot on it. The light-receiving section 4 senses the light from the bright spot on the sense object 6 and outputs light position signals and received light amount signals. The distance-operating section 18 operates distances from the light position signals on the light-receiving section 4 and outputs distance signals. Besides the target-received-light-amount-operating section 19 outputs the target values of the received light amounts on the distance signals. The nearer the distances become, the larger the target values of the received light amounts are made to become. The light-irradiation-controlling section 17 compares the received light signals from the light-receiving section 4 and the target values of the received light from the target-received-light-amount-operating section 19 and outputs output-controlling signals on the differences of the comparison, and further the light-irradiation-controlling section 17 controls the light irradiation amounts of the Light-irradiating section 3 on the differences of the comparison. The outputting section 20 outputs the distance signals from the operating section 18 on the output-controlling signals from the light-irradiation-controlling section 17 in the case where the received light amounts are close enough to the target values of the received light.

FIG. 13 is a more concrete example of the light-controlling section 17 in the case where the light irradiated from the light-irradiating section 3 is made to be pulse-shaped.

In FIG. 13, reference numeral 21 denotes an integrator. Numeral 22 denotes a holder. Numeral 23 denotes a resetter. Numeral 24 denotes an error determiner. And numeral 25 denotes a computer.

In FIG. 13, pulse-shaped received light signals are integrated in the integrator 21, and the integrated values are held by the holder 22. After the integrated values are held in the holder 22, the resetter 23 resets the integrator 21 till the next pulse will be irradiated. The irradiation intensity of the next pulse is deduced by comparing and operating the outputs of the holder 22 and the target values of the received light amounts by the computer 25, and the irradiation intensity of the next pulse is outputted to the light-irradiating section 3 as a programmed irradiation value. The error determiner 24 receives the outputs of the holder 22 and the target values of the received light as inputted signals, and the error determiner 24 determines the errors between the received light amounts and the target values of the received light and outputs output-controlling signals.

Figure 14:
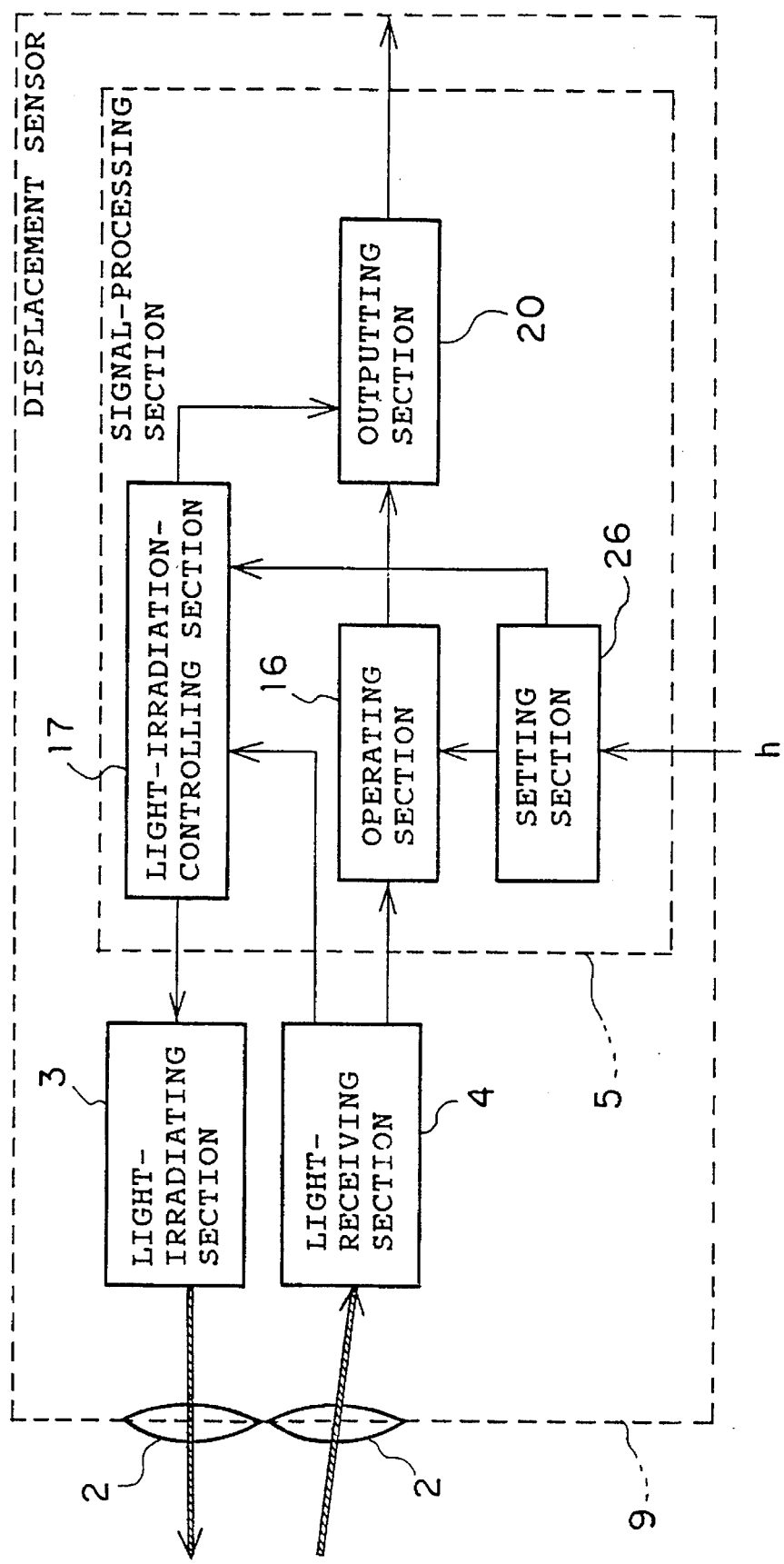
FIG. 14 is a block diagram showing a displacement sensor composed of the photoelectric distance sensor of the invention.
Figure 15:
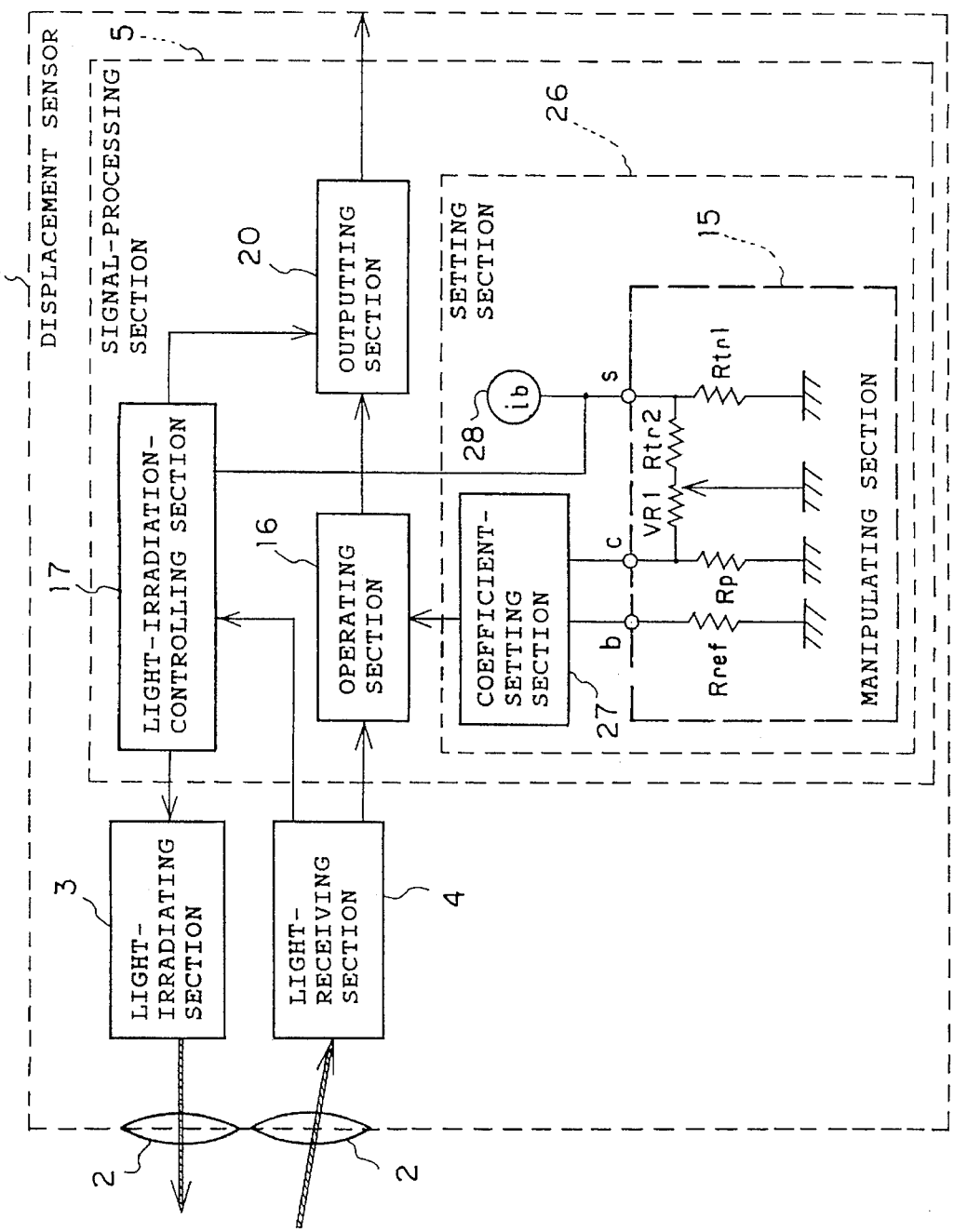
FIG. 15 is a block diagram showing a displacement sensor including a concrete example of the setting section in the displacement sensor shown in FIG. 14

Next, the displacement sensor of the present invention will be described. FIG. 14 is a whole block diagram showing the displacement sensor of the invention. FIG. 15 is a whole block diagram showing the displacement sensor including a concrete example of the setting section in the displacement sensor.

In FIG. 14, reference numeral 26 denotes a setting section. The signal-processing section 5 is composed of the setting section 26, light-irradiation-controlling section 77, operating section 16 and outputting section 20.

In FIG. 14, the light-irradiating section 3 irradiates light to sense objects, and the reflected light from the sense objects is sensed by the light-receiving section 4. The setting section 26 sets reference distances X0 and outputs coefficients according to the reference distances X0. The operating section 16 outputs position signals operated with the signals from the light-receiving section 4 and the coefficients from the setting section 26. The outputting section 20 outputs output signals according to the signals from the operating part 16. The light-irradiation-controlling section 17 controls the irradiation amounts of the light-irradiating section 3 according to the coefficients from the setting section 26 and the signals from the light-receiving section 4.

The above mentioned setting section 26 of FIG. 14 has a coefficient setting section 27 and the manipulation section 15, as shown in FIG. 15. Reference numeral 28 denotes a current source. Besides, in the manipulation section 75, characters "Rref" denote a reference resistor, characters "Rp" denote a parallel resistor, characters "VR1" denote a variable resistor, characters "Rtr1" denote a parallel resistor, and characters "Rtr2" denote a serial resistor. The coefficient setting section 27 works so as to pass the same current through the point "c" as the current flowing through the point "b" The voltage corresponding to the variable resistor VR1 in the manipulating section 15 is produced at the point "c" at this time. The reference distance X0 is given from manipulation amounts of the variable resistor VR1 of the manipulating section 15. The parallel resistor Rp is connected to the variable resistor VR1. Because much of the current at point "c" flows into the variable resistor VR1 while the value of the variable resistor VR1 are from 0 to the value close to Rp, the voltages at point "c" varies greatly according to the variation of the variable resistor VR1. However, because much of the current at point "c" flows into the resistor Rp when the value of the variable resistor VR1 becomes lager than Rp, the voltage variations at point "c" become smaller even if the variable resistor VR1 varies. The case that the value of the variable resistor VR1 is small corresponds to the case that the reference distance X0 is small, and the case that the value of the variable resistor VR2 is large corresponds to the case that the reference distance X0 is large. The voltage at the point "c" determines operation coefficients corresponding to light positions on the light-receiving surface corresponding to the reference distances X0. Thus, nonlinearity is given to the relation between synthesized resistance values and variable resistance positions by providing the parallel resistor Rp to the variable resistor VR1, and the degree of the nonlinearity can be freely set by the resistance values of the parallel resistor Rp. And further, the nonlinearity of the X-Y conversion is corrected by the above mentioned nonlinearity.

The target values of light irradiation are determined by the voltage at the point "s". As the prescribed current flows through the point "s" by the current source 28, the voltage at the point "s" varies in dependence on the value of the variable resistor VR1. The voltage at the point "s" becomes large when the reference distance X0 is small, that is when the value of the variable resistor VR1 is small, so the target values of the received light becomes large. When the reference distance X0 is large, the target values of the received light becomes large similarly. The nonlinearity of the "s" point voltage to the reference distance XO, the minimum voltage and the maximum voltage can be freely changed by the selection of the values of the parallel resistors Rtr1 and Rtr2. Even if the circuits except the manipulation section 15 is integrated, the nonlinearity of the X-Y conversion and the nonlinearity required for the target values of the light irradiation can be freely changed with only the external parts of the integrated circuit.

Figure 16:
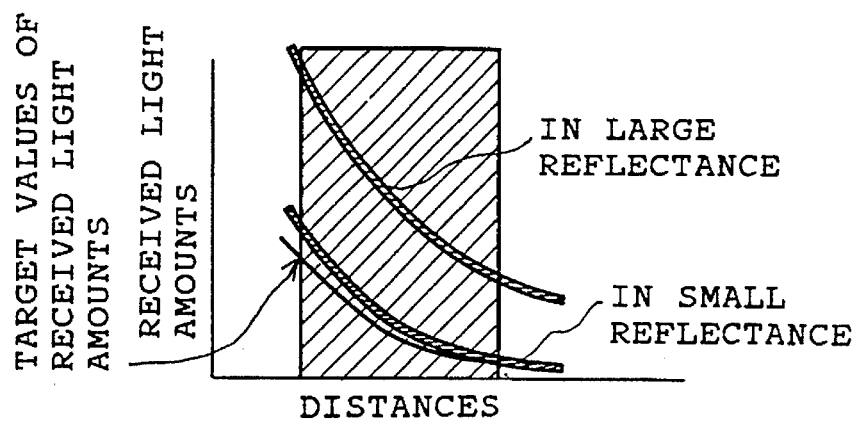
FIG. 16 is a characteristic diagram for explaining a relation between a distance range and target values of the received light amounts in the photoelectric distance sensor of the invention.
Figure 17:
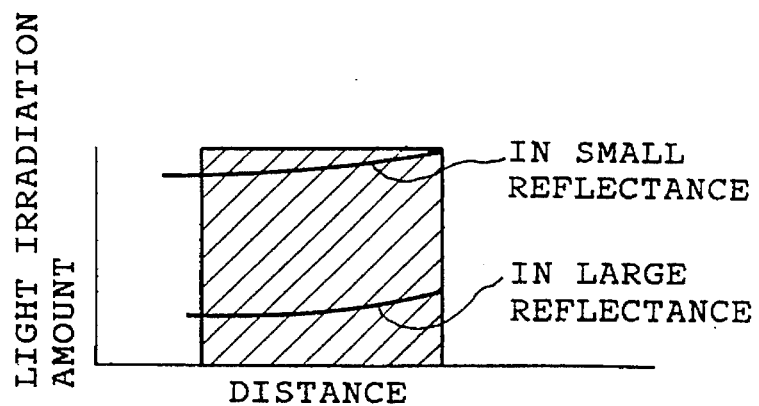
FIG. 17 is an characteristic diagram for explaining the relation between a distance range and irradiated light amounts in the photoelectric distance sensor of the invention.

The relation between the distance range of the photoelectric distance sensor of the invention and the target values of the received light is shown in FIG. 16. From FIG. 16, the target values of the received light is seen to be changed according to distances. Besides, the relation between the distance range of the photoelectric distance sensor and irradiated light amounts is shown in FIG. 17. From FIG. 17, the irradiated light amounts to the distances are seen to be nearly constant at each reflectance.

Figure 1:
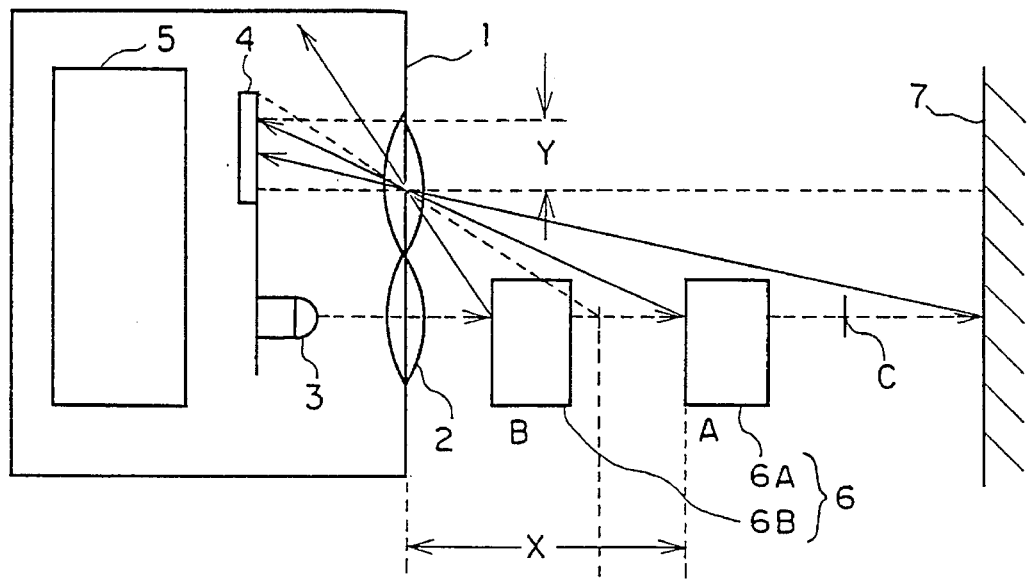
FIG. 1 is a block diagram drawn with single lines for explaining the basic operation of a conventional photoelectric distance sensor for sensing positions.
Figure 2:
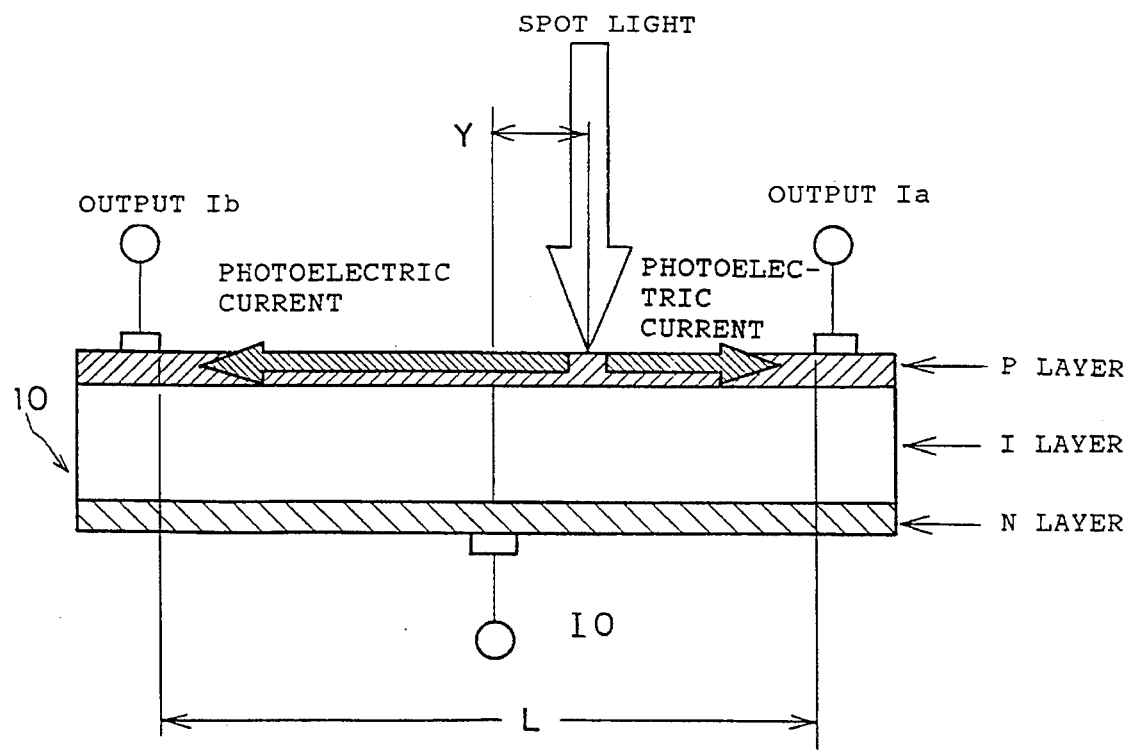
FIG. 2 is a longitudinal section of a conventional light-position-sensing device.
Figure 3:
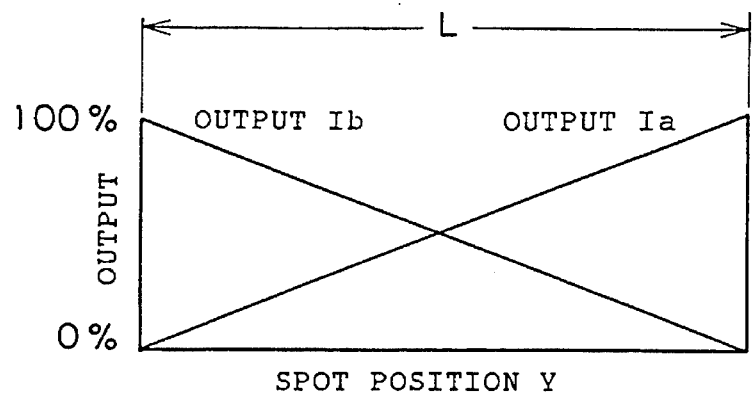
FIG. 3 is a characteristic diagram of the light-position-sensing device.
Figure 4:
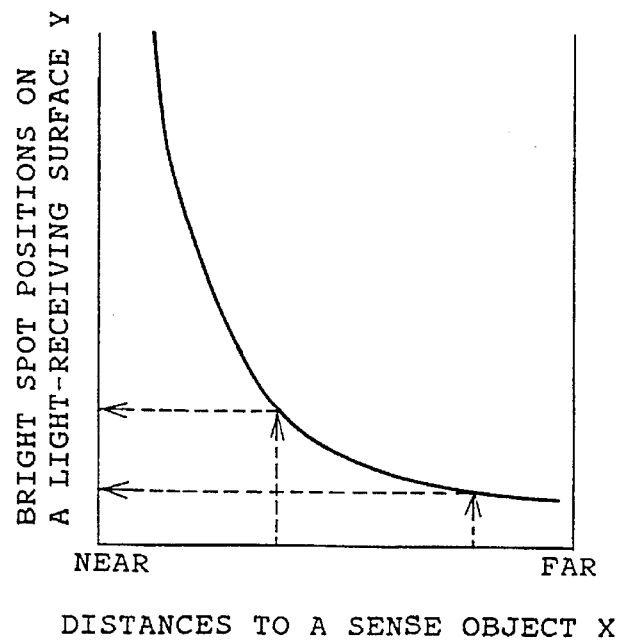
FIG. 4 is a characteristic diagram showing the relation between distances X to a sense object and bright spot image positions Y on a light-receiving surface in a photoelectric distance sensor.
Figure 5:
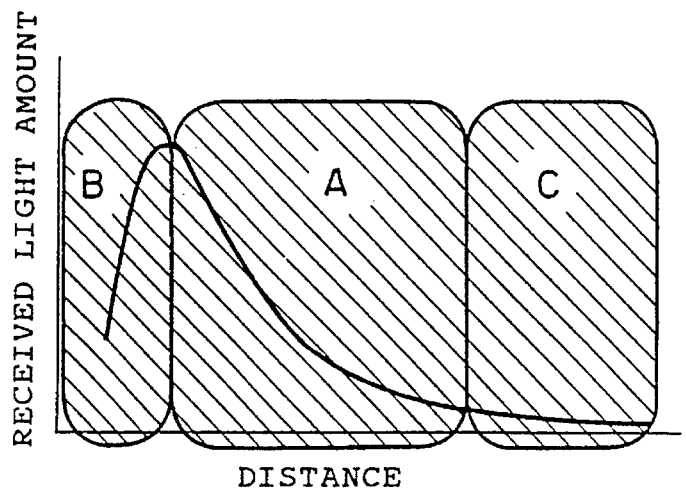
FIG. 5 is a characteristic diagram showing the relation between distances and received light amounts when irradiated light amounts are constant.
Figure 6:
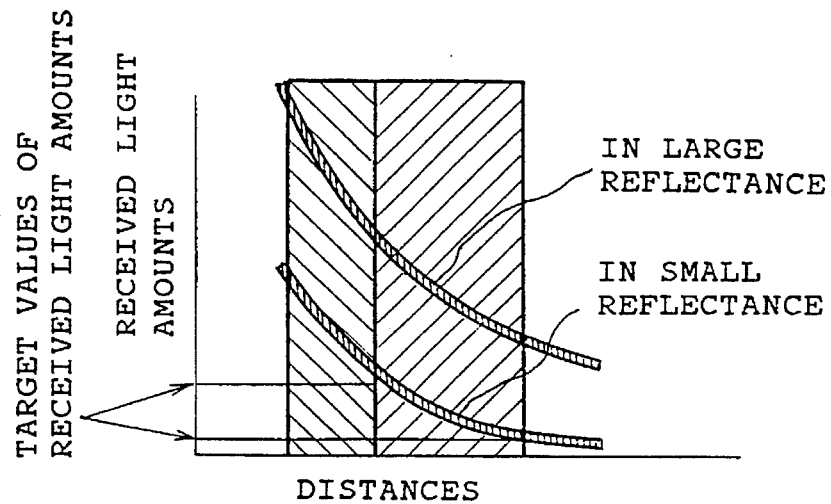
FIG. 6 is an explanatory drawing for explaining the relation between distance ranges and target values of the received light amounts in a conventional photoelectric distance sensor.

As mentioned above, the photoelectric distance sensor of the present invention is constructed to control the irradiated light amounts of a light-irradiating section irradiating light to a sense object so that received light amounts may coincide the target values of the received light according to distances to the sense object, therefore the influence due to the differences of sense object surfaces are eliminated, and such high precision as can be obtained in measurements of the same distance objects with narrow band width photoelectric distance sensor can be obtained with wide distance-measurable ranges. Besides, although the description above is made about the cases of the application of the apparatus shown in FIG. 9, FIG. 10 and FIG. 11, which are the inventions disclosed in a pending application to the United States Patent and Trademark Office and the European Patent Office, the photoelctric distance sensors shown in FIG. 2 and FIG. 3 may be applicable. That is to say, since the light position signals and the light amount signals can be obtained from the photoelectric sensor shown in FIG. 2 and FIG. 3, too, just the same operation as described above can be attained.

Besides, the photoelectric distance sensor of the present invention is constructed to control the light amounts to be irradiated from a light-irradiating section irradiating light to a sense object so that received light amounts may coincide with the target values of received light according to reference distances, therefore the influence due to the differences of sense object surfaces are eliminated, and such high precision as can be obtained in measurements of the same distance objects with photoelectric distance sensors having narrow setting ranges of reference distances X0 can be obtained with the photoelectric sensor of the invention having wide setting ranges of reference distances X0. Besides, such effects are obtained that the kinds of the light-receiving device composing a light-receiving section are not restricted.

What is claimed is:

1. A photoelectric distance sensor comprising in combination:

light-irradiating means for forming a light spot on an object;

light responsive sensor means having a light-receiving surface and means for forming an image of said light spot on said light-receiving surface, said light responsive sensor means generating a first output signal indicative of the position of said light spot on said light responsive sensor means and a second output signal indicative of the amount of light forming said image;

means responsive to said first output signal for generating a distance signal indicative of the distance between said light responsive sensor means and said object;

means for generating a target value for said amount of light forming said image, said target value increasing with a decreasing distance between said light responsive sensor means and said object, said distance being indicated by said distance signal from said light responsive sensor means;

means for comparing said target value and said second output signal to generate an error signal; and means responsive to said error signal to control said light-irradiating means so that the amount of light forming said image corresponds to said target value.

2. Photoelectric distance sensor according to claim 1, wherein said means responsive to said error signal to control said light-irradiating means comprises:

an integrator for integrating a received light signal, a holder for holding an output signal of said integrator, a resetter for resetting said integrator and said holder, an error determiner for receiving an output of said holder and said target value of said received light as inputs, and for determining the error between said received light amount and said target value of received light, and further outputting an output-controlling signal, and a computer for receiving said output of said holder and said target value of received light, and for computing a programmed light irradiation value, and further for outputting said light irradiation value.

3. Photoelectric distance sensor according to claim 1, wherein said light responsive sensor means is composed of an arrangement of many light-receiving elements in a specified direction on said light-receiving surface.

4. A photoelectric distance sensor comprising:

light-irradiating means for forming a light spot on an object;

light responsive sensor means having a light-receiving surface and means for forming an image of said light spot on said light-receiving surface, said light responsive sensor means generating a first output signal indicative of the actual distance between said light responsive sensor means and said object and a second output signal indicative of the amount of light forming said image;

means for setting a reference distance between said light responsive sensor means and said object, said reference distance being dependent upon a measurable range of distance to said object;

means for setting a target value for the amount of light forming said image, said target value increasing with decreasing of said reference distance;

light-irradiation-controlling means for controlling the intensity of light from said light-irradiating means in such a way that the amount of light forming said image coincides with said target value; and means for receiving said first output signal from said light responsive sensor means and said reference distance from said means for setting a reference distance, to output a displacement signal indicative of a displacement between said actual distance and said reference distance.

5. Photoelectric distance sensor according to claim 4, wherein said means for setting a reference distance comprises:

a manipulation section for setting said reference distance, a coefficient-setting section for outputting a coefficient corresponding to said reference distance, and a current source.

6. Photoelectric distance sensor according to claim 5, wherein said manipulating section comprises:

a reference resistor and a parallel resistor connected to said coefficient-setting section respectively, a parallel resistor connected to said current source, and a variable resistor and a serial resistor connected between said coefficient-setting section and said current source in series to each other.

7. Photoelectric distance sensor according to claim 4, wherein said light responsive sensor means is composed of an arrangement of many light-receiving elements in a specified direction on said light-receiving surface.

8. A photoelectric distance sensing method comprising the steps of:

forming a light spot on an object;

forming an image of said light spot on a light responsive sensor means;

generating a first output signal indicative of the position of said light spot on said light responsive sensor means and a second output signal indicative of the amount of light forming said image;

generating a distance signal indicative of the distance to said object in response to said first output signal;

generating a target value signal, which decreases with increasing distance to said object as indicated by said distance signal;

comparing said target value signal and said second output signal to generate an error signal;

controlling said light-irradiating means in response to said error signal so that the amount of light forming said image corresponds to a target amount of light.

* * * * *